No. 850,134. PATENTED APR. 16, 1907.
S. S. CHILDS.
SPRING WHEEL.
APPLICATION FILED DEC. 27, 1906.

WITNESSES:
E. A. Pell
R. Johnson

INVENTOR
Samuel S. Childs,
BY
Wm. H. Canfield
ATTORNEY

UNITED STATES PATENT OFFICE.

SAMUEL S. CHILDS, OF BERNARDSVILLE, NEW JERSEY.

SPRING-WHEEL.

No. 850,134.　　　Specification of Letters Patent.　　　Patented April 16, 1907.

Application filed December 27, 1906. Serial No. 349,702.

*To all whom it may concern:*

Be it known that I, SAMUEL S. CHILDS, a citizen of the United States, residing at Bernardsville, in the county of Somerset and State of New Jersey, have invented certain new and useful Improvements in Spring-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention is of a class of spring-wheels, and is an improvement on the form of wheel shown and described in my application, Serial No. 336,534, filed September 28, 1906, and is designed to provide a wheel of this kind that has a body portion supplied with a felly and having a rim at a distance therefrom and with flat springs secured at their centers to the felly and having the ends in contact with the inside of the rim.

The present improvement consists in springs, preferably of a spiral form, that fit in between the ends of the flat springs, take up the motion between these springs to furnish more resiliency, and also to act as transmitting means when power is applied to either the rim or the body portion of the wheel to insure the turning of the body portion and the rim together.

The invention is illustrated in the accompanying drawings, in which—

Figure 1:
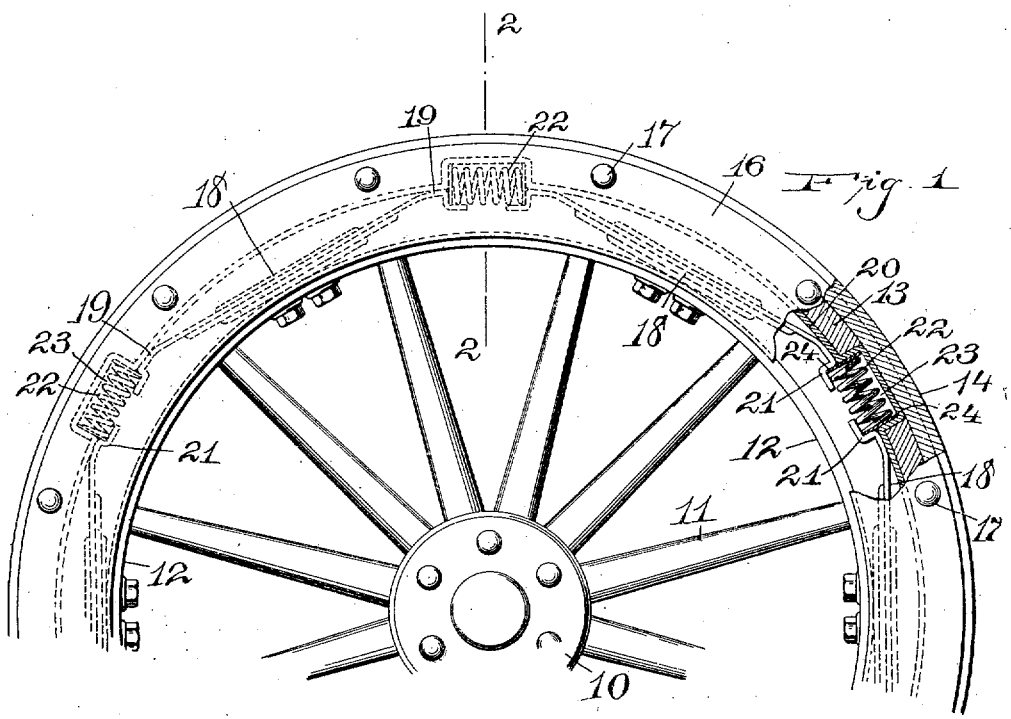
Figure 2:
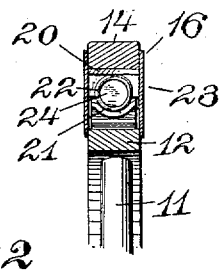

Figure 1 is a side view of part of a wheel of my new construction, broken away at one point, showing the rim in section. Fig. 2 is a section on line 2 2 in Fig. 1.

The body portion of the wheel embraces a hub 10, spokes 11, and a felly 12. These elements are common to all wheels and may be of the usual constructions. Outside of the felly and removed therefrom by a considerable space is a rim 13, provided with a tire portion 14. Secured to the rim 13 is a guard-plate 16, held securely by means of the bolt 17 and projecting over slightly onto the felly 12 under normal conditions.

The spring members in my wheel are preferably straight and flat, as at 18, and the ends 19 are in engagement with the inner edge of the rim 13, which is provided with a band 20, which is made of a hard substance, such as steel, to take up the wear of the springs. I form on the ends 19 of one of the springs 18 a shoulder 21, this shoulder on adjacent springs inclosing to a slight extent on one side a spring 22, which is preferably spiral and is arranged in a recess 23 in the rim. I prefer to back up the springs on each side with a disk or plate 24 to center the springs and to not allow a rocking contact between the shoulder 21 and the springs 22. Different forms of springs from the syle shown in the drawings can be supplied in place of the springs 22, and the particular form of contact means between the springs 18 and the springs 22 can be departed from. If this wheel is used on the driving-axle of a motor-car—for instance, when power is applied to the body portion of the wheel—the springs 18 will all be thrust in one direction and each spring on one end will come in contact with one of the springs 22, and the vehicle will start without any shock or jar, and when the spring is compressed and the power is still applied the spring 22 in its compressed shape will act to transmit power and be a transmitting medium between the springs 18 and the rim 13.

If no power-transmission is called for, the springs 22 will be compressed when a weight is placed on a vehicle to which the wheel is attached, and thus allow the easy sliding or working of the ends 19 of the springs 18 on the inner surface of the rim. It will thus be seen that the springs 22 have an office as spring members between the ends of the springs 18 and also as spring members between the ends of the springs 18 and the opposed wall of the recess 23 in the rim 13.

Having thus described my invention, what I claim is—

1. A spring-wheel comprising a body portion having a felly, a rim surrounding the felly at a distance therefrom forming a circular space between them, a set of flat straight springs arranged in this space and secured at their centers to the felly, and having their ends in engagement with the inside of the rim, the rim being provided with recesses on its inner face between the adjacent ends of the springs, and a second set of springs, one in each recess and bearing on the end walls of the recess, and also being in contact with the ends of the adjacent flat springs.

2. A spring-wheel comprising a body portion having a felly, a rim surrounding the felly at a distance therefrom forming a space between them, and being provided with recesses on its inner face, a set of flat straight springs in the space between the felly and the rim, and having their ends alongside the end walls of the recesses, and spiral springs arranged in the recesses and arranged to bear on the ends of the adjacent flat springs.

In testimony that I claim the foregoing I have hereunto set my hand this 24th day of December, 1906.

SAMUEL S. CHILDS.

Witnesses:
 Gus A. Meyer,
 Wm. H. Camfield.